United States Patent

[15] 3,640,825

Kolaian

[45] Feb. 8, 1972

| | | | |
|---|---|---|---|
| [54] | DRILLING FLUID | | |
| [72] | Inventor: | Jack H. Kolaian, Wappingers Falls, N.Y. | |
| [73] | Assignee: | Texaco, Inc., New York, N.Y. | |
| [22] | Filed: | Apr. 27, 1970 | |
| [21] | Appl. No.: | 32,354 | |

Related U.S. Application Data

[62] Division of Ser. No. 633,434, Apr. 25, 1967.

[52] U.S. Cl. ..........................252/8.5 C, 252/351, 252/356
[51] Int. Cl. ................C10m 3/26, C10m 3/24, C10m 3/14
[58] Field of Search................................252/8.5 C, 351, 356

[56] References Cited

UNITED STATES PATENTS

| 1,999,766 | 4/1935 | Lawton et al. | 252/8.5 |
|---|---|---|---|
| 2,333,133 | 11/1943 | Wayne | 252/8.5 |
| 2,393,273 | 1/1946 | Wayne | 252/8.5 |

OTHER PUBLICATIONS

Rogers Composition and Properties of Oil Well Drilling Fluids, Second Edition, Pub. 1953 by Gulf Pub. Co. of Houston, Texas, pages 310 and 319 to 322. Tischenko et al., Article in Journal of Applied Chemistry of the U.S.S.R., Vol. 35, No. 3, March 1962, pages 611 to 619.

*Primary Examiner*—Herbert B. Guynn
*Attorney*—Thomas H. Whaley, Carl G. Reis and James F. Young

[57] ABSTRACT

An aqueous drilling fluid dispersant and a method of drilling wells using said drilling fluid which contains a substituted dihydroxybenzene compound as the dispersant, namely, a dihydroxybenzene compound selected from the group consisting of a 1,2-dihydroxybenzene containing as a substituent in the 4 position a nitro-, a chloro-, a formyl-, or a (2'-carboxyethenyl)-group and mixtures of said compounds.

14 Claims, No Drawings

DRILLING FLUID

This is a division application of my application, Ser. No. 633,434, filed Apr. 25, 1967.

This invention relates to a novel aqueous drilling fluid for drilling wells through subsurface formations by means of well drilling tools, and particularly to such an aqueous well drilling fluid having improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine, or water. Such fluids have a number of different functions, the most important of which are to assist in the removal of cuttings from the well, to seal off formations of gas, oil, or water which may be encountered at different levels, to lubricate the drilling tool and drill pipe which carries the tool, and to hold the cuttings in suspension in event of shutdowns in drilling.

An ideal drilling fluid is a thixotropic colloidal systerm, i.e., a fluid which on agitation or circulation (as by pumping or otherwise), has a measurable relatively low viscosity and is free flowing (not plastic), particularly at high temperatures; but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid as the dispersant a substituted dihydroxybenzene compound selected from the group consisting of (a) a compound having the general formula

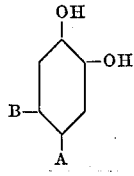

wherein A is an alkyl, nitro, halo, hydroxy, formyl, carboxy or a carboxyalkenyl radical, B is hydrogen or halo, including mixtures of said compounds, and (b) a compound having the general formula

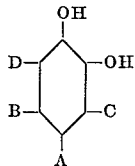

wherein A and B both are quinoid oxygen, C and D both are hydrogen or halo, and the quinoid tautomers thereof; said dihydroxybenzene being present in the drilling fluid in an amount sufficient to reduce the viscosity thereof.

It is known from the article appearing in Zhur. Priklad. Khem. 35, pages 638–647 (1962), "Organic Viscosity Reducer in Clay Solutions" by D. Tischenko and S. Fleisher (CA, 57, 2491g, 1962), that the ortho-dihydroxybenzenesulfonic acids, the ortho-dihydroxyalpha-toluenesulfonic acids and water soluble salts thereof are viscosity reducing agents in clay laden drilling fluids whereas the corresponding meta- and para-dihydroxybenzenes including the corresponding sulfonic acid derivatives and water soluble salts thereof are ineffective viscosity reducing agents for aqueous drilling fluids.

The term "substituted dihydroxybenzene compound" as used in the specification and claims is intended to cover any substituted dihydroxybenzene compound meeting either of the above general formulas including mixtures of such compounds.

More particularly representative substituted dihydroxybenzene compounds of the present invention include the alkyl substituted dihydroxybenzenes such as 4-methyl-, 4-ethyl-, 4-isopropyl-, 4-tertiarybutyl-, 4-hexyl- and 4-octyl-1,2-dihydroxybenzenes, substituted dihydroxybenzenes such as 4-nitro-, 4-chloro-, 4-hydroxy-, 4-formyl-, 4-carboxy-, 4-(2'-carboxyethenyl)-, and 4-methyl-5-chloro-1,2-dihydroxybenzene, 2,5-dihydroxy-1,4-benzoquinone, 2,5-dihydroxy-3,6-dichloro-1,4-benzoquinone, including the quinoid tautomers thereof, 4,5-dihydroxy-1,2-benzoquinone and 4,5-dihydroxy-3,6-dichloro-1,2-benzoquinone, respectively, and mixtures of these compounds.

It is surprising that these compounds are effective dispersants when other related benzenes such as the ortho-, meta- and para-dihydroxybenzenes, 1,2,3-trihydroxybenzene, 4-hydroxycinnamic acid, tetrahydroxy-1,4-benzoquinone, Di Potassium Rhodizonate and 2,3,4-trihydroxy-1-decanoylbenzene are ineffective drilling fluid dispersants.

The preferred dispersants of the present invention include the 4-methyl-1,2-dihydroxybenzene, 4-(2'-carboxyethenyl)-1,2-dihydroxybenzene, 4-carboxy-1,2-dihydroxybenzene, 4-hydroxy-1,2-dihydroxybenzene, 4-nitro-1,2-dihydroxybenzene, 4-chloro-1,2-dihydroxybenzene and the 4-methyl-5-chloro-1,2-dihydroxybenzene species since these materials exhibit the most effective dispersing properties in aqueous drilling fluids.

All of the above named preferred 1,2-dihydroxybenzene species exhibit superior dispersing activity and high temperature stability in aqueous drilling fluids particularly at the high bottom hole temperature encountered in present day drilling operations. By the term "high bottom hole temperatures" as used in the specification and claims is meant temperatures in excess of about 250° F. which are commonly encountered in the relatively deep wells of the order of more than 10,000 feet being drilled today. These particular substituted dihydroxybenzenes not only exhibit superior high temperature stability but also maintain the drilling fluid in the fluidized, low gel state at such temperatures.

In addition the substituted dihydroxybenzene compounds of the present invention can be used as drilling fluid dispersants at much lower concentrations than known dispersants such as the calcium lignosulfonates or ferrochrome lignosulfonates in both high and low temperature applications in aqueous drilling fluids, particularly in drilling fluids suited for drilling operations in areas wherein heaving or sloughing shale formations are encountered.

Another aspect of this invention is that a modified shale control drilling fluid can be formulated for use in such heaving or sloughing shale formations in a rapid, efficient manner especially with the 4-methyl-, 4-(2'-carboxyethenyl)-, 4-methyl-5-chloro-, 4-nitro-, 4-chloro-, and 4-hydroxy-1,2-dihydroxybenzene species of the present invention. This modified shale control drilling fluid contains lime and caustic but is free from any added water soluble calcium salt. This modified shale control drilling fluid can attain the same beneficial results as achieved with the shale control drilling fluid of Weiss and Hall, U.S. Pat. No. 2,802,783, i.e., stabilizing and hardening the shale formations in contact therewith.

The shale control drilling fluid of U.S. Pat. No. 2,802,783 requires a water soluble calcium salt to be present therein to provide a calcium ion concentration of 200 p.p.m. or more in the drilling fluid to attain comparable shale hardening and stabilization.

This surprising and wholly unexpected result achieved with the 4-methyl, 4-(2'-carboxyethenyl)-, 4-methyl-5-chloro, 4-nitro-, 4-chloro-, and 4-hydroxy-1,2-dihydroxybenzene species of the present invention cannot be attained with other known drilling fluid dispersants such as calcium lignosulfonate or ferrochrome lignosulfonate.

In the preparation of an improved drilling fluid in accordance with this invention a drilling fluid-additive material can conveniently be employed. In accordance with one embodiment, for use in drilling through heaving or sloughing shale formations with a modified shale control reagent additive admixture, a drilling fluid-additive composition comprises an admixture of a water soluble alkalinity agent such as lime or calcium hydroxide and the preferred substituted dihydroxybenzene compounds of the present invention. The composition of this admixture is usually in the weight ratio range of 0.5 to 3.0 parts of the alkalinity agent lime or calcium hydroxide per part of the dihydroxybenzene compound, preferably a weight ratio of 0.75 to 1.5 for the most satisfactory results. This modified shale control additive composition embodiment is particularly suitable in drilling fluids being used in heaving or sloughing shale formations because it avoids the need of using therewith the water soluble hygroscopic salt calcium chloride.

In another embodiment for a shale control additive composition such as disclosed in U.S. Pat. No. 2,802,783, one may incorporate in the aqueous drilling fluid a water soluble calcium salt such as calcium chloride, calcium sulfate or the like in addition to lime and the substituted dihydroxybenzene compound, the weight ratio range of such an admixture may be 0.5 to 3.0 parts of lime or calcium hydroxide alkalinity agent, 0.1–1.0 part of water soluble calcium salt, e.g., calcium chloride, and 0.5 to 5 parts of substituted dihydroxybenzene compound. The above weight ratio ranges can be modified dependent on the equivalent or molecular weights of the respective components of the admixture and whether the components are employed in the anhydrous or hydrated form.

If desired other drilling fluid additives can be incorporated in the additive composition such as starch or carboxymethylcellulose as water loss agents, etc.

These additive admixtures are preferably in solid form but may also be in the form of an aqueous slurry or solution.

A drilling fluid in accordance with the present invention can be prepared by the addition of the drilling fluid reagent admixture to water or to a water containing hydratable clayey material together with conventional drilling fluid materials such as water loss agents, weighting agents, emulsifying agents and the like. One may also convert an aqueous drilling fluid such as a low lime mud, a gyp mud, a shale control mud, a high pH low lime mud, a sea water mud or the like to the aqueous drilling fluid of the present invention by the addition thereto of the additive composition disclosed herein or by the separate addition of the various components making up the admixture as required to provide the desired type drilling fluid containing the substituted dihydroxybenzene of the present invention.

The substituted dihydroxybenzenes of the present invention may be added to an aqueous drilling fluid in amounts ranging from about 0.1 pound to about 10 pounds per barrel of drilling fluid. In general, it has been found that amounts less than 0.1 pound per barrel do not produce completely satisfactory results in terms of dispersing activity whereas amounts above about 10 pounds per barrel are economically unattractive and no improved results are obtained therewith. A preferred range for the substituted dihydroxybenzenes of the present invention is from about 0.25 to about 5 pounds per barrel of drilling fluid for most consistent results and efficiency.

The substituted dihydroxybenzenes employed in the present invention are known compounds and the manner of their preparation is known in the art.

A general discussion of high temperature phenomena follows, with particular reference to the significance of shear or gel strength measurements, and the viscosity of samples.

In general, some degree of high temperature gelation occurs in most clay-water systems when exposed to temperatures above normal. High temperatures effect the drilling fluids used in drilling operations to recover petroleum from underground formation. Under static conditions temperature tends to accelerate the development of gel structure in the mud. The end result of this gel development will depend upon the temperature, time for development, and susceptibility of the mud to gelation. The strength of the gel developed will range from a low, easily measured gel, through plasticity to a rigid cementlike mass which practically defies classification as a gel.

Another observed high temperature effect is on viscosity. As with the gel development, temperature may have little or no effect on the viscosity of the mud or may thicken the mud to a point where it becomes practically unpumpable. The end viscosity of a mud appears to be independent of whether the mud has been continually agitated or remained quiescent during the heating cycle. The effect of temperature on the physical properties of muds may be classified into three characteristic patterns.

Normal Response to Temperature

Drilling mud slurries possess a property known as thixotropy. The clay particles of the slurry tend to orient themselves with time under a static condition to produce a semirigid gel structure. Elevated temperatures tend to accelerate the rate of formation and degree of development of this property to such an extent that muds often develop gel structures of appreciable strength.

Muds possessing a normal response to temperature will refluidize to a condition approximating their original viscosity when subjected to mechanical agitation.

Abnormal Response to Temperature

In a second response to temperature, which is called high temperature gelation, the muds undergo relation to yield similar semirigid structures; but these gels are not thixotropic. Therefore, the muds will not refluidize satisfactorily but remain as highly viscous to semiplastic slurries.

The degree of gelation cannot of itself be used to distinguish muds of this type for, although the degree of gelation in muds of this type is usually somewhat higher than in muds possessing normal temperature response, there can be appreciable overlap between the two types. The important criterion is the retention or loss of thixotropic response following high temperature aging.

High Temperature Solidification

The most severe reaction to temperature is often referred to as high temperature solidification. In this case a more complex rigid structure is formed which in severe cases approaches a cementlike solid consistency. These muds usually have lost any resemblance to a thixotropic fluid and upon agitation may tend to granulate and crumble into a discontinuous mass.

In the tables, gel strength (Gels) is reported as determined by a shearometer in accordance with the procedure in the American Petroleum Institute publication RP–29, results being expressed either as pounds/100 square feet or as time in seconds for a tube to settle in the mud (after the mud has stood for zero time and for 10 minutes). If it settles in more than 60 seconds, shear is reported as pounds per hundred square feet. Yield Point (YP) is calculated by subtracting the Plastic Viscosity (PV) from the Fann Viscosity reading at 300 r.p.m. Plastic Viscosity (PV) is obtained by calculation, subtracting the Fann reading at 300 r.p.m. from the 600 r.p.m. reading. Apparent Viscosity (AV) is equal to one-half of the Fann Viscosity reading obtained at 600 r.p.m. The fluidity of a mud can be back calculated from these data, the results being expressed in Fann Viscosity at 600 r.p.m. and 300 r.p.m. for a direct reading viscosimeter.

The properties of the base muds are shown in the tables.

The test data set forth in the following tables indicate the surprising advantages of the substituted dihydroxybenzenes of

TABLE I

| Ex. | Additional additive, lbs. | Type mud | Amount and type dispersant | PV | YP | Ap. vis., cpc. | Shearometer gels, lb./100 ft.² | | pH | Pm, cc. | API W.L. cc. | Pf, cc. | Ca, p.p.m. | Time, hours |
|---|---|---|---|---|---|---|---|---|---|---|---|---|---|---|
| | | | | | | | 0¹ | 10¹ | | | | | | |
| 1 | | LpH¹ | 0.5 A³ | 9 | 5 | 11.5 | | | 9.3 | | | | | 0.25 |
| | | | | 12 | 2 | 13 | | | 9.5 | | | | | 2 |
| | | | | 15 | 3 | 16.5 | 0¹ | 0¹ | 9.6 | | 17 | | | 16 |
| 1a | 1 NaCl | | | 13 | 0 | 13 | 0¹ | 0¹ | 9.4 | | | | | 32 |
| 1b | 3 NaCl | | | 13 | 2 | 14 | 0¹ | 0² | 9.4 | | | | | 48 |
| 1c | 5 NaCl | | | 13 | 9 | 17.5 | 0¹ | 0⁵ | 9.5 | | | | | 50 |
| 1d | 2.5 Lime | ModSC² | 2.5 A | 7 | 52 | 33 | | | 12.1 | | | | | 0.25 |
| | | | | 12 | 9 | 16.5 | | | 12.2 | | | | | 2 |
| | | | | 12 | -4 | 10 | 0¹ | 0¹ | 12.1 | 6.1 | 74 | 1.8 | 712 | 16 |
| | Properties after bombing 8 hrs. at 300° F. | | | | | | | | High temp. shear <80 | | | | | |
| 1e | | | 2 A | 10 | -3 | 8.5 | | | 11.5 | 2.1 | | 0.5 | 112 | 24 |
| | | | | 11 | 7 | 14.5 | | | 9.7 | | | | | 2 |
| 1f | 2.5 Lime | | | 12 | 12 | 18 | | | 12.5 | | | | | 0.25 |
| | | | | 13 | -3 | 11.5 | | | 12.5 | | | | | 2 |
| | | | | 12 | -4 | 10 | 0¹ | 0¹ | 12.4 | 9.1 | 20.4 | 3.1 | 368 | 16 |
| | | | | | | | | | High temp. shear <80 | | | | | |

¹ LpH—Low pH mud.   ² ModSC—Modified shale control mud (No CaCl₂ or NaOH present).   ³ A—2'-carboxyethenyl-1,2-dihydroxybenzene.

TABLE II

| Ex. | Additional additive, lbs. | Type mud | Amount and type dispersant | PV | YP | Ap. vis., cpc. | Shearometer gels, lb./100 ft.² | | pH | Pm, cc. | API W.L. cc. | Pf, cc. | Ca, p.p.m. | Time, hours |
|---|---|---|---|---|---|---|---|---|---|---|---|---|---|---|
| | | | | | | | 0¹ | 10¹ | | | | | | |
| 2 | | LpH¹ | 0.5 B⁴ | 11 | 9 | 16.5 | | | 9.7 | | | | | 0.25 |
| | | | | 15 | 9 | 19.5 | | | 9.6 | | | | | 2 |
| | | | | 18 | 4 | 20 | 0¹ | 0¹⁰ | 9.5 | | 13.4 | | | 16 |
| 2a | | | 1.0 B | 10 | 11 | 15.5 | | | 9.5 | | | | | 0.25 |
| | | | | 16 | 10 | 21 | | | 9.4 | | | | | 2 |
| 2b | | | 1.5 B | 23 | 10 | 28 | 0¹ | 0¹⁶ | 9.7 | | 14.0 | | | 16 |
| | | | | 13 | 7 | 16.5 | | | 8.9 | | | | | 2 |
| 2c | 3.0 NaCl | | 1.5 B | 15 | 7 | 18.5 | | | 9.2 | | 16.6 | | | 16 |
| 2d | 0.25 Na₂CrO₄ | | 1.5 B | 13 | 29 | 27.5 | | | 9.1 | | | | | 40 |
| 2e | 2.5 Lime | ModSC² | 1.5 B | 18 | 4 | 20 | 0¹ | 0⁴ | 9.7 | | 16.8 | | | 64 |
| | | | | 10 | 5 | 12.5 | 0²⁰ | 4.0 | 12.3 | 6.7 | 45.6 | 2.1 | 1004 | 16 |
| 2f | 3.0 Lime plus 1.0 CaCl₂ | SC³ | 3.5 B | 9 | 11 | 14.5 | 3.3 | 4.1 | 12.4 | 12.0 | 91 | 5.2 | 2120 | 16 |
| | Properties after bombing 8 hrs. at 300° F. | | | | | | | | High temperature shear 200 | | | | | |

¹ LpH—Low pH mud.   ² ModSC—Modified shale control mud.   ³ SC—Shale control mud.   ⁴ B—4-carboxy-1,2-dihydroxybenzene.

TABLE III

| Ex. | Additional additive, lbs. | Type mud | Amount and type dispersant | PV | YP | Ap. vis., cpc. | Shearometer gels, lb./100 ft.² | | pH | Pm, cc. | API W.L. cc. | Pf, cc. | Ca, p.p.m. | Time, hours |
|---|---|---|---|---|---|---|---|---|---|---|---|---|---|---|
| | | | | | | | 0¹ | 10¹ | | | | | | |
| 3 | | LpH¹ | 0.5 C³ | 11 | 7 | 14.5 | | | 9.8 | | | | | 0.25 |
| | | | | 16 | 13 | 22.5 | | | 9.9 | | | | | 2 |
| 3a | 1.0 NaCl | | | 19 | 4 | 21 | 0¹ | 0⁸ | 9.7 | | 15.6 | | | 16 |
| 3b | 2.5 Lime | ModSC² | 2.5 C | 17 | 3 | 18.5 | | | 9.7 | | | | | 32 |
| | | | | 11 | 7 | 14.5 | 0² | 3.3 | 11.8 | 5.8 | 30 | 1.4 | 920 | 16 |
| 4 | | LpH | 0.25 D⁴ | 8 | 9 | 12.5 | | | | | | | | 0.25 |
| | | | | 13 | 3 | 14.5 | | | | | | | | 2 |
| 4a | | LpH | 0.5 D | 16 | 2 | 17 | 0¹ | 0³ | 9.8 | | 16.8 | | | 16 |
| | | | | 19 | 3 | 20.5 | 0¹ | 0¹·² | 9.6 | | | | | 16 |
| 4b | | LpH | 1.0 D | 9 | 7 | 12.5 | | | | | | | | 0.25 |
| | | | | 9 | 10 | 14 | | | | | | | | 2 |
| 4c | 2.5 Lime | ModSC | 2.5 D | 16 | 5 | 18.5 | 0¹ | 0⁹ | 9.5 | | 14.4 | | | 16 |
| | | | | 11 | 5 | 13.5 | 0² | 0¹⁰ | 11.9 | 6.5 | 44.4 | 23 | 1016 | 16 |
| | | | | | | | | | High temperature shear <80 | | | | | |

¹ LpH—Low pH mud.   ² ModSC—Modified shale control mud.   ³ C—4-formyl-1,2-dihydroxybenzene.   ⁴ D—4-chloro-1,2-dihydroxybenzene.

TABLE IV

| Ex. | Additional additive, lbs. | Type mud | Amount and type dispersant | PV | YP | Ap. vis., cpc. | Shearometer gels, lb./100 ft.² | | pH | Pm, cc. | API W.L. cc. | Pf, cc. | Ca, p.p.m. | Time, hours |
|---|---|---|---|---|---|---|---|---|---|---|---|---|---|---|
| | | | | | | | 0¹ | 10¹ | | | | | | |
| 5 | | LpH¹ | 0.5 E³ | 9 | 6 | 12 | | | 10.1 | | | | | 0.25 |
| | | | | 13 | 8 | 17 | | | 9.7 | | | | | 2 |
| 5a | 2.0 NaCl | | 0.5 E | 19 | 4 | 21 | 0¹ | 0⁶ | 9.6 | | | | | 16 |
| | | | | 14 | 10 | 19 | | | 9.7 | | | | | 2 |
| | | | | 15 | 1 | 16.5 | | | 9.6 | | | | | 16 |
| 5b | 2.5 Lime | ModSC² | 2.5 E | 13 | -3 | | | | 12.0 | | | | | 0.25 |
| | | | | 13 | -2 | | | | 12.0 | | | | | 2 |
| | | | | 12 | -3 | | 0¹ | 0² | 11.9 | 5.2 | 26 | 1.0 | 424 | 16 |
| | Properties after bombing 8 hours at 300° F. | | | | | | | | High temperature shear <80 | | | | | |
| | | | | 10 | 23 | | | | 1.4 | | | | | |

¹ LpH—Low pH mud.   ² ModSC—Modified shale control mud.   ³ E-4-nitro-1,2-dihydroxybenzene.

the present invention and demonstrate the beneficial results of same in improving the dispersibility of drilling fluids.

Representative physical properties of drilling fluids both before and after addition of various materials including the substituted dihydroxybenzenes of the present invention are shown in the tables. In each example thereof the amount of material or materials added to the base muds are shown, expressed in terms of pounds of material per barrel of drilling fluid.

The data in Table I above show that 4-(2'-carboxyethenyl)-1,2-dihydroxybenzene is an effective dispersant in low pH and modified shale control drilling fluids. The data also show (Examples 1b and c) that the presence of considerable amounts of contaminants such as sodium chloride do not adversely effect the properties of the drilling fluid. The data further show that material is most effective at concentrations of 2 and 2.5 pounds per barrel after a time lapse of about 16 hours, when used in a modified shale control mud and about 0.5 pound per barrel when used in a low pH mud.

The data in Table II above show that 4-carboxy-1,2-dihydroxybenzene is an effective dispersant in aqueous drilling fluids after a period of about 2 hours, and that the best results are obtained after the material is in the drilling fluid for a 16 hour period.

The data in the above Table III show that the 4-formyl- and the 4-chloro-1,2-dihydroxybenzene species are effective drilling fluid dispersants in both low pH and Modified Shale Control mud systems.

TABLE V

| Ex. | Additional additive, lbs. | Type mud | Amount and type dispersant | PV | YP | Ap. vis., cpe. | Shearometer gels, lb./100 ft.² 0¹ | Shearometer gels, lb./100 ft.² 10¹ | pH | Pm, cc. | API W.L., cc. | Pf, cc. | Ca, p.p.m. | Time, hours |
|---|---|---|---|---|---|---|---|---|---|---|---|---|---|---|
| 6 | | LpH¹ | 0.5 F³ | 9 | 15 | 16.5 | | | 9.3 | | | | | 0.25 |
| | | | | 11 | 2 | 12 | | | 9.5 | | | | | 2 |
| | | | | 15 | 2 | 16 | 0¹ | 0² | 9.4 | | 16.6 | | | 16 |
| 6a | 1.0 NaCl | | 0.5 F | 14 | 1 | 14.5 | 0¹ | 0³ | 9.6 | | | | | 32 |
| 6b | 3.0 NaCl | | 0.5 F | 14 | 11 | 19.5 | 0¹ | 0³⁰ | 9.3 | | 15.4 | | | 48 |
| 6c | | | 2.0 F | 18 | 8 | 22 | 0¹ | 0¹³ | 9.4 | | 14.6 | | | 16 |
| 7 | | LpH | 0.5 G⁴ | 13 | 0 | 13 | | | 9.6 | | | | | 0.25 |
| | | | | 20 | 1 | 20.5 | | | 9.9 | | | | | 2 |
| | | | | 34 | 5 | 36.5 | 0³ | 0³⁰ | 9.9 | | 15.8 | | | 16 |
| 7a | 1.0 NaCl | | 0.5 G | 20 | 5 | 22.5 | 0² | 0¹⁵ | 9.8 | | | | | 32 |
| 7b | | | 1.0 G | 10 | 10 | 15 | | | 9.7 | | | | | 0.25 |
| | | | | 16 | 12 | 22 | | | 9.5 | | | | | 2 |
| | | | | 20 | 6 | 23 | 0² | 3.3 | 9.4 | | 13.8 | | | 16 |
| 7c | 2.5 Lime | ModSC² | 2.5 G | 10 | 8 | 14 | 4.3 | 4.6 | 12.1 | 3.8 | 64.8 | 1.0 | | 16 |

High temperature shear 120

¹ LpH—Low pH mud. ² ModSC—Modified shale control mud. ³ F—1,2,4-trihydroxybenzene. ⁴ G—4-t-butyl-1,2-dihydroxybenzene.

TABLE VI

| Ex. | Additional additive, lbs. | Type mud | Amount and type dispersant | PV | YP | Ap. vis., cpe. | Shearometer gels, lb./100 ft.² 0¹ | Shearometer gels, lb./100 ft.² 10¹ | pH | Pm, cc. | API W.L. cc. | Pf, cc. | Ca, p.p.m. | Time, hours |
|---|---|---|---|---|---|---|---|---|---|---|---|---|---|---|
| 8 | | LpH¹ | 0.25 H² | 9 | 16 | 17 | | | 9.9 | | | | | 0.25 |
| | | | | 16 | 5 | 18.5 | | | 9.9 | | | | | 2 |
| | | | | 20 | 7 | 23.5 | 0¹ | 0¹¹ | 9.2 | | 14.4 | | | 16 |
| 8a | | | 0.5 H | 12 | 5 | 14.5 | | | 9.8 | | | | | 0.25 |
| | | | | 20 | 5 | 22.5 | | | 9.4 | | | | | 2 |
| | | | | 22 | 4 | 24 | 0² | 0³¹ | 9.7 | | 15.8 | | | 16 |
| 8b | 2.0 NaCl | | 0.5 H | 13 | 14 | 20 | 0³ | 1.5 | 9.6 | | 14.6 | | | 18 |
| 8c | | | 2.0 H | 20 | 0 | 20 | | | 9.6 | | | | | 0.25 |
| | | | | 25 | 0 | 25 | | | 9.4 | | | | | 2 |

¹ LpH—Low pH mud. ² H—4-isopropyl-1,2-dihydroxybenzene.

TABLE VII

| Ex. | Additional additive, lbs. | Type mud | Amount and type dispersant | PV | YP | Ap. vis., cpe. | Shearometer gels, lb./100 ft.² 0¹ | Shearometer gels, lb./100 ft.² 10¹ | pH | Pm, cc. | API W.L. cc. | Pf, cc. | Ca, p.p.m. | Time, hours |
|---|---|---|---|---|---|---|---|---|---|---|---|---|---|---|
| 9 | | LpH¹ | 0.01 I² | | | 16 | 6.7 | 10 | 9.5 | | 16.2 | | | 6 |
| 9a | | | 0.025 I | | | 10 | 0⁴ | 7.8 | 9.9 | | 16.2 | | | 16 |
| 9b | | | 0.05 I | | | 6 | 0² | 3.8 | 9.8 | | 15.6 | | | 16 |
| 9c | | | 0.25 I | | | 2 | 0¹ | 0³ | 9.7 | | 17.2 | | | 16 |
| 9d | | | 0.25 Q-B³ | | | 10 | 0² | 4.8 | 9.7 | | 14.8 | | | 16 |
| 9e | | | 0.25 QUE⁴ | | | 12 | 0² | 5.4 | 9.7 | | 14.8 | | | 16 |
| 9f | | | 0.5 I | | | 2 | 0¹ | 0⁴ | 9.7 | | 17.2 | | | 16 |
| 9g | | | 0.5 Q-B³ | | | 6 | 0¹ | 0¹¹ | 9.4 | | 14.2 | | | 16 |
| 9h | | | 0.5 QUE⁴ | | | 5 | 0¹ | 0¹⁵ | 9.3 | | 15.8 | | | 16 |
| 9i | | | 1.0 I | | | 6 | 0² | 0²⁰ | 9.5 | | 14.8 | | | 16 |
| 9j | | | 1.0 Q-B | | | 2 | 0¹ | 0³ | 9.4 | | 14.4 | | | 16 |
| 9k | | | 1.0 QUE | | | 2 | 0¹ | 0⁸ | 9.7 | | 13.6 | | | 16 |

¹ LpH—Low pH mud. ² I—4-methyl-1,2-dihydroxybenzene. ³ Q-B—Q-Broxin. ⁴ QUE—Quebracho.

TABLE VIII

| Ex. | Additional additive, lbs. | Type mud | Amount and type dispersant | PV | YP | Ap. vis., cpe. | Shearometer gels, lb./100 ft.² 0¹ | Shearometer gels, lb./100 ft.² 10¹ | pH | Pm, cc. | API W.L. cc. | Pf, cc. | Ca, p.p.m. | Time, hours |
|---|---|---|---|---|---|---|---|---|---|---|---|---|---|---|
| 10 | 1.0 NaCl | LpH¹ | 0.13 I² | 16 | 7 | 19.5 | 0² | 0¹⁰ | 9.7 | | 15.2 | | | 16 |
| 10a | 1.0 NaCl | | 0.25 I | 16 | 2 | 17 | 0¹ | 0³ | 9.7 | | | | | 16 |
| 10b | 3.0 NaCl | | | 14 | 11 | 19.5 | 0² | 0²⁵ | 9.4 | | 15.0 | | | 16 |
| 10c | 1.0 NaCl | | 0.5 I | 15 | 0 | 15 | | | 9.4 | | | | | 16 |
| 10d | 3.0 NaCl | | | 15 | 1 | 16.5 | 0¹ | 0⁵ | 9.5 | | 16.6 | | | 16 |
| 10e | 1.0 NaCl | | 1.0 I | 19 | −1 | 18.5 | | | 9.6 | | | | | 16 |
| 10f | 3.0 NaCl | | | 19 | 4 | 21 | 0¹ | 0⁸ | 9.5 | | 14.4 | | | 16 |
| 10g | 3.0 NaCl | | 0.25 I | 21 | 7 | 24.5 | 0¹ | 0¹⁷ | 9.7 | | | | | 16 |
| 10h | 5.0 NaCl | | | 15 | 23 | 26.5 | 4.8 | 11 | 9.4 | | | | | 16 |
| 10i | 5.0 NaCl plus 0.25 Na₂CrO₄ | | | 17 | 21 | 27.5 | 0⁵ | 8.4 | 9.6 | | 15.0 | | | 16 |
| 10j | 3.0 NaCl | | 0.5 I | 16 | 4 | 18 | 0¹ | 0⁹ | 10.0 | | | | | 16 |
| 10k | 5.0 NaCl | | | 18 | 19 | 27.5 | 0¹ | 5.5 | 9.7 | | | | | 16 |
| 10l | 5.0 NaCl plus 0.25 Na₂CrO₄ | | | 18 | 10 | 23 | 0¹ | 0²⁸ | 9.6 | | 14.2 | | | 16 |
| 10m | 3.0 NaCl | LpH¹ | 1.0 Q-B³ | 19 | 5 | 21.5 | 0¹ | 0⁹ | 9.4 | | | | | 16 |
| 10n | 5.0 NaCl | | | 19 | 13 | 25.5 | 0² | 6.3 | 9.3 | | | | | 16 |
| 10o | 5.0 NaCl plus 0.25 Na₂CrO₄ | | | 20 | 18 | 29 | 0³ | 6.5 | 9.3 | | 15.2 | | | 16 |
| 10p | 3.0 NaCl | | 1.0 QUE⁴ | 23 | 11 | 28.5 | 0¹ | 3.3 | 9.4 | | | | | 16 |
| 10q | 5.0 NaCl | | | 20 | 14 | 27 | 0² | 8.0 | 9.4 | | | | | 16 |
| 10r | 5.0 NaCl plus 0.25 Na₂CrO₄ | | | 22 | 8 | 26 | 0¹ | 0¹⁵ | 9.4 | | 14.6 | | | 16 |

¹ LpH—Low pH mud. ² I—4-methyl-1,2-dihydroxybenzene. ³ Q-B—Broxin. ⁴ QUE—Quebracho.

TABLE IX

| Ex. | Additional additive, lbs. | Type mud | Amount and type dispersant | PV | YP | Ap. vis., cps. | Shearometer gels, lb./100 ft.² | | pH | Pm, cc. | API W.L., cc. | Pf, cc. | Ca, p.p.m. | Time, hours |
|---|---|---|---|---|---|---|---|---|---|---|---|---|---|---|
| | | | | | | | 0¹ | 10¹ | | | | | | |
| 11 | 2.5 Lime | ModSC¹ | 2.5 I³ | 10 | 27 | 23.5 | | | | | | | | 0.25 |
| | | | | 15 | −6 | 12 | | | | | | | | 2 |
| | | | | 9 | −3 | 7.5 | 0¹ | 0¹ | 12.3 | 6.6 | 48.0 | 2.6 | 1,192 | 16 |
| | Properties after bombing for 8 hours at 300° F. | | | | | | | | | High temperature shear <80 | | | | |
| | | | | 9 | −3 | 7.5 | | | | | | | | 24 |
| 12 | 3.0 Lime plus 1.0 CaCl₂. | SC² | 3.5 Q-B⁴ | 11 | 85 | 53.5 | | | 12.4 | | | | | 0.25 |
| | | | | 18 | 25 | 30.5 | | | 12.3 | | | | | 2 |
| | | | | 28 | 7 | 31.5 | 0¹ | 0¹ | 12.1 | 9.2 | 31.2 | 1.3 | 720 | 16 |
| | Properties after bombing for 8 hours at 300° F. | | | | | | | | | High temperature shear 390 | | | | |
| | | | | 11 | 196 | 109 | | | | | | | | 24 |
| 13 | 3.0 Lime plus 1.0 CaCl₂. | SC | 3.5 KEM⁵ | 15 | 58 | 44 | | | 12.4 | | | | | 0.25 |
| | | | | 19 | 17 | 27.5 | | | 12.3 | | | | | 2 |
| | | | | 31 | 7 | 34.5 | | | 12.2 | 10.4 | 31.2 | 1.6 | 624 | 16 |
| | Properties after bombing for 8 hours at 300° F. | | | | | | | | | High temperature shear 600 | | | | |
| | | | | 15 | 174 | 102 | | | | | | | | 24 |

¹ ModSC—Modified shale control mud.  ² SC—Shale control mud.  ³ I—4-methyl-1,2-dihydroxybenzene.  ⁴ Q-B—Q-Broxin.
⁵ KEM—Calcium lignosulfonate.

TABLE X

| Ex. | Additional additive, lbs. | Type mud | Amount and type dispersant | PV | YP | Ap. vis., cps. | Shearometer gels, lb./100 ft.² | | pH | Pm, cc. | API W.L., cc. | Pf, cc. | Ca, p.p.m. | Time, hours |
|---|---|---|---|---|---|---|---|---|---|---|---|---|---|---|
| | | | | | | | 0¹ | 10¹ | | | | | | |
| 14 | 2.5 Lime | LpH¹ | 2.0 I³ | 13 | 5 | 16.5 | | | | | | | | 0.25 |
| | | | | 10 | −3 | 8.5 | 0¹ | 0² | 12.2 | 7.3 | 37.2 | 2.9 | 896 | 16 |
| 15 | 3.0 Lime | ModSC² | 1.5 I | 11 | 20 | 21 | | | 12.0 | | | | | 0.25 |
| | | | | 11 | 1 | 11.5 | | | 12.1 | | | | | 2 |
| | | | | 10 | −3 | 8.5 | 0¹ | 0¹ | 12.2 | 9.5 | 60 | 3.1 | 752 | 16 |
| | Properties after bombing 8 hours at 300° F. | | | | | | | | | High temperature shear <80 | | | | |
| | | | | 7 | 0 | 7 | 0¹ | 0¹ | 11.7 | 5.8 | | 0.8 | 216 | 24 |
| 16 | 2.5 Lime | | 1.75 I | 8 | 19 | 17.5 | | | 12.5 | | | | | 0.25 |
| | | | | 10 | 1 | 10.5 | | | 12.3 | | | | | 2 |
| | | | | 10 | −3 | 8.5 | 0¹ | 0¹ | 12.2 | 7.5 | 64.4 | 2.6 | 904 | 16 |
| | Properties after bombing 8 hours at 300° F. | | | | | | | | | High temperature shear <80 | | | | |
| | | | | 7 | 1 | 7.5 | | | | | | | | 24 |
| 17 | 3.0 Lime | | 2.0 I | 11 | 15 | | | | 12.4 | | | | | 0.25 |
| | | | | 11 | −2 | | | | 12.4 | | | | | 2 |
| | | | | 10 | −4 | | 0¹ | 0¹ | 12.2 | 9.8 | 60 | 3.1 | 992 | 16 |
| | Properties after bombing 8 hours at 300° F. | | | | | | | | | High temperature shear <80 | | | | |
| | | | | 8 | −2 | 7 | | | | | | | | 24 |

¹ LpH—Low pH mud.  ² ModSC—Modified shale control mud.  ³ I—4-methyl-1,2-dihydroxybenzene.

TABLE XI

| Ex. | Additional additive, lbs. | Type mud | Amount and type dispersant | PV | YP | Ap. vis., cps. | Shearometer gels, lb./100 ft.² | | pH | Pm, cc. | API W.L., cc. | Pf, cc. | Ca, p.p.m. | Time, hours |
|---|---|---|---|---|---|---|---|---|---|---|---|---|---|---|
| | | | | | | | 0¹ | 10¹ | | | | | | |
| 18 | | LpH¹ | 1.5 W³ | 20 | 19 | 29.5 | | | 9.0 | | | | | 24 |
| 19 | | LpH | 4.0 X⁴ | 9 | 24 | 21 | 9.5 | 12.5 | 10.7 | | 18.6 | | | 16 |
| 20 | | LpH | 0.5 Y⁵ | 18 | 30 | 33 | 11 | 17.5 | 9.2 | | | | | 16 |
| 20a | | | 1.0 Y | 10 | 32 | 26 | 12 | 20 | 9.6 | | | | | 16 |
| 20b | 2.5 Lime | ModSC² | 2.5 Y | 7 | 84 | 49 | 9.5 | 8.0 | 11.3 | 5.4 | 113.2 | 2.5 | 1,020 | 16 |

¹ LpH—Low pH mud.  ² ModSC—Modified shale control mud.  ³ W—1,2,3-trihydroxybenzene.  ⁴ X—1,3-dihydroxybenzene.  ⁵ Y—4-hydroxycinnamic acid.

From the data in Table IV it is evident that 4-nitro-1,2-dihydroxybenzene exhibits satisfactory dispersing activity in a low pH mud and also in a modified shale control mud. The low Yield Point values and zero gels obtained with this material in a modified shale control mud at concentrations of about 2.5 pounds per barrel are indicative of the dispersing activity of this material.

Table V above, Examples 6–6c, shows that 1,2,4-trihydroxybenzene exhibits dispersing properties in a low pH mud as is evidenced by the low Yield Point and Gel Strength values obtained.

This table, Examples 7–7b, also shows that 4-tertiary butyl-1,2-dihydroxybenzene is an effective drilling fluid dispersant at concentrations of 0.5 and 1.0 pound per barrel, even when contaminated with a salt (Example 7a). Example 7c shows that the high temperature shear value is 120, indicating the stability of the mud at high temperatures.

Table VI above shows that 4-isopropyl-1,2-dihydroxybenzene is an effective drilling fluid dispersant at concentrations of 0.25–2.0 pounds per barrel. The low Yield Point and Gel Strength Values shown in the table demonstrate its effectiveness in a low pH mud system. Example 8b shows that the presence of moderate amounts of salt as a contaminant does not adversely effect the desirable characteristics imparted to the drilling fluid by this material.

Table VII above shows that 4-methyl-1,2-dihydroxybenzene is an effective drilling fluid dispersant. The data show that this particular material is very effective in very low concentrations, i.e., 0.01–0.25 pound per barrel in a low pH mud system. Only at somewhat higher concentrations, i.e., 0.5 and 1.0 pound per barrel, does the commercial dispersant known by the trade name "Q-Broxin," a ferrochrome lignosulfonate, and another commercial dispersant, Quebracho, approach the effectiveness of 4-methyl-1,2-dihydroxybenzene as a dispersant.

Table VIII above shows the presence of contaminating amounts of salt in an aqueous low pH mud system containing 4-methyl-1,2-dihydroxybenzene does not impair the properties of the drilling fluid. The data, Examples 10, 10a and 10b, indicate that even with from about 8 times and 12 times as much salt in the drilling fluid as dispersant, the drilling fluid properties are good. In Example 10h, wherein 20 times as much salt contaminant is present (20 pounds vs. 0.25 pound), the properties of the drilling fluid are effected somewhat but the addition of a minor amount of chromate salt thereto (Example 10i) offsets the effect.

A comparison of results shown for Example 10f (1.0 pound dispersant and 3.0 pounds salt) with the results for comparative Example 10m containing an equal amount of salt and Q-Broxin, and also comparative Example 10p containing a like amount of salt and Quebracho, reveals that the drilling fluid properties of Examples 10f and 10m are about equal and both are superior to the Example 10p containing Quebracho.

The above Table IX shows the properties of modified shale control drilling fluids containing 4-methyl-1,2-dihydroxybenzene.

TABLE XII

| Ex. | Additional additive, lbs. | Type mud | Amount and type dispersant | PV | YP | Ap. vis., cpc. | Shearometer gels, lb./100 ft.² 0¹ | Shearometer gels, lb./100 ft.² 10¹ | pH | Pm, cc. | API W.L. cc. | PF, cc. | Ca, p.p.m. | Time, hours |
|---|---|---|---|---|---|---|---|---|---|---|---|---|---|---|
| 21 | | LpH¹ | 0.35 J² | 18 | 1 | | | | | | | | | 0.25 |
| | | | | 14 | 7 | | | | | | | | | 2 |
| | | | | 20 | 6 | | 0¹ | 0¹¹ | 9.5 | | | | | 16 |
| 22 | | LpH | 0.5 K³ | 11 | 6 | 14 | | | 9.3 | | | | | 0.25 |
| | | | | 15 | 3 | 16.5 | | | 9.3 | | | | | 2 |
| | | | | 19 | 5 | 21.5 | 0¹ | 0⁹ | 9.4 | | 15.6 | | | 16 |
| 22a | | | 2.0 K | 9 | 0 | 9 | | | 9.4 | | | | | 0.25 |
| | | | | 11 | −1 | 10.5 | | | 9.4 | | | | | 2 |
| | | | | 14 | 1 | 14.5 | 0¹ | 0³ | 9.4 | | 16.4 | | | 16 |
| 23 | | LpH | 2.0 L⁴ | 19 | 7 | 22.5 | 0¹ | 5.2 | 11.0 | | 15.4 | | | 16 |

¹ LpH—Low pH mud.  ² J—4-methyl-5-chloro-1,2-dihydroxybenzene.  ³ K—2,5-dihydroxy-1,4-benzoquinone.  ⁴ L—2,5-dihydroxy-3,6-dichloro-1,4-benzoquinone.

TABLE XIII

| Ex. | Additional additive, lbs. | Type mud | Amount and type dispersant | PV | YP | Ap. vis., cpc. | Shearometer gels, lb./100 ft.² 0¹ | Shearometer gels, lb./100 ft.² 10¹ | pH | Pm, cc. | API W.L. cc. | PF, cc. | Ca, p.p.m. | Time, hours |
|---|---|---|---|---|---|---|---|---|---|---|---|---|---|---|
| 24 | | LpH¹ | 0.5 WW³ | 23 | 22 | 34 | 3.7 | 6.9 | 9.3 | | 14.2 | | | 16 |
| 24a | | | 2.0 WW | 20 | 35 | 37.5 | 4.8 | 12 | 9.5 | | 16 | | | 16 |
| 24b | | ModSC² | 2.5 WW | 5 | 21 | 15.5 | 15.5 | 4.0 | 10.5 | 0.8 | 45.6 | 0.2 | 240 | 16 |
| 25 | | LpH | 0.5 WW⁴ | 15 | 18 | | | | | | | | | 2 |
| | | | | 20 | 28 | | 9 | −17 | 8.9 | | 15.4 | | | 16 |
| 25a | | | 1.0 XX | 11 | 15 | | | | | | | | | 0.25 |
| | | | | 16 | 21 | | | | 8.8 | | | | | 24 |
| 26 | | LpH | 0.5 YY⁵ | 8 | 24 | | | | | | | | | 0.25 |
| | | | | 12 | 24 | | | | | | | | | 2 |
| | | | | 16 | 25 | | 6.5 | 15 | 9.9 | | 15.6 | | | 16 |
| 26a | | | 2.0 YY | 9 | 20 | | | | | | | | | 0.25 |
| | | | | 10 | 22 | | | | | | | | | 2 |
| | | | | 19 | 23 | | 5.9 | 10 | 9.6 | | 14.6 | | | 16 |

¹ LpH—Low pH mud.  ² ModSC—Modified shale control mud.  ³ WW—Tetrahydroxy-1,4-benzoquinone.  ⁴ XX—Dipotassium rhodizonate.  ⁵ YY—2,3,4-trihydroxy-1-decanoylbenzene.

TABLE XIV

| Ex. | Additional additive, lbs. | Type mud | Amount and type dispersant | PV | YP | Ap. vis., cpc. | Shearometer gels, lb./100 ft.² 0¹ | Shearometer gels, lb./100 ft.² 10¹ | pH | Pm, cc. | API W.L. cc. | Pf, cc. | Ca, p.p.m. | Time, hours |
|---|---|---|---|---|---|---|---|---|---|---|---|---|---|---|
| 27 | | LpH¹ | 0.35 M³ | 13 | 7 | | | | | | | | | 0.25 |
| | | | | 17 | 4 | | | | | | | | | 2 |
| | | | | 19 | 3 | 20.5 | 0¹ | 0⁵ | 9.5 | | | | | 16 |
| 27a | 2.5 Lime | ModSC² | 2.5 M | 9 | −1 | | 0¹ | 0² | 11.7 | 5.4 | | 1.1 | 568 | 32 |
| | Properties after bombing 8 hours at 300° F. | | | | | | | | High temperature shear <80 | | | | | |
| | | | | 10 | 3 | 11.5 | | | | | | | | 40 |

¹ LpH—Low ph mud.  ² ModSC—Modified shale control mud.  ³ M—50/50 by weight mixture of 4-methyl-5-chloro-1,2-dihydroxybenzene and 4-methyl-1,2-dihydroxybenzene.

For comparative purposes, Example 12 containing the commercial dispersant Q-Broxin, and Example 13 containing a calcium lignosulfonate dispersant sold by the Trade Name "Kembreak" were included in the table. These commercial dispersants were made up in a shale control mud system since they cannot impart the needed shale control chemistry to a drilling fluid without having a source of soluble calcium salt present.

The mud properties of Example 11, shown in the table, indicate the 4-methyl-1,2-dihydroxybenzene is superior to either of those commercial dispersants, particularly with respect to the very low Yield Point values obtained therewith, after 15 minutes, 2 hours and 16 hours. Particularly significant is the retention of desirable drilling fluid properties after exposure to a temperature of 300° F. for 8 hours as is shown for Example 11 whereas the drilling fluids containing Q-Broxin and Kembreak, respectively, Examples 12 and 13, showed adverse properties after the 8 hours at 300° F. treatment. The High Temperature Shear value obtained with Example II (<80) is more than 400 percent less than the 390 value obtained with Example 12 containing Q-Broxin and at least 750 percent less than the 600 value obtained in Example 13 containing Kembreak.

Table X above shows that 4-methyl-1,2-dihydroxybenzene also exhibits excellent dispersing properties in Low pH and Modified Shale Control mud systems at varying concentrations and that these properties are retained after the muds have been heated for 8 hours at 300° F. In Examples 15–17 the High Temperature Shear Values were less than 80, the lowest reading obtainable on the test instrument.

The data in Table XI show that other substituted compounds such as 1,2,3-trihydroxybenzene, 1,3-dihydroxybenzene and 4-hydroxy-cinnamic acid do not exhibit dispersing activity in aqueous drilling fluids as is evidenced by the high gel values obtained therewith.

The data in Table XII above show that 4-methyl-5-chloro-1,2-dihydroxybenzene, 2,5-dihydroxy-1,4-benzoquinone and 2,5-dihydroxy-3,6-dichloro-1,4-benzoquinone are effective drilling fluid dispersants (Examples 21–23 inclusive).

The data in Table XIII above show that other substituted benzene compounds such as tetrahydroxy-1,4-benzoquinone, Di Potassium Rhodizonate and 2,3,4-trihydroxy-1-decanoylbenzene are ineffective drilling fluid dispersants.

Table XIV above shows that mixtures of the substituted dihydroxybenzenes of the present invention are effective dispersants in aqueous drilling fluids and that these mixtures also exhibit good high temperature properties.

The substituted dihydroxybenzene compounds of the present invention can be used in the form of mixtures in drilling fluids. Suitable ranges are from 30–70 percent of one dihydroxybenzene compound and 70–30 percent of another dihydroxybenzene compound. A particularly desirable range is in the order of about 40–60 percent of one compound and 60–40 percent of the other compound.

Obviously, many modifications and variations of the invention as hereinbefore set forth may be made without departing from the spirit and scope thereof, and therefore, only such limitations should be imposed as are indicated in the appended claims.

I claim:
1. An aqueous drilling fluid containing clay solids dispersed therein and as the dispersant a substituted dihydroxybenzene compound selected from the group consisting of a 1,2-dihydroxybenzene containing as a substituent in the 4 position a nitro-, a chloro-, a formyl-, or a (2'-carboxyethenyl)-group and mixtures of said compounds, said dihydroxybenzene compound being present in the drilling fluid in an amount sufficient to reduce the viscosity thereof.

2. An aqueous drilling fluid as claimed in claim 1 wherein the substituted dihydroxybenzene compound is 4-nitro-1,2-dihydroxybenzene.

3. An aqueous drilling fluid as claimed in claim 1 wherein the substituted dihydroxybenzene compound is 4-chloro-1,2-dihydroxybenzene.

4. An aqueous drilling fluid as claimed in claim 1 wherein the substituted dihydroxybenzene compound is 4-formyl-1,2-dihydroxybenzene.

5. An aqueous drilling fluid as claimed in claim 1 wherein the substituted dihydroxybenzene compound is 4-(2'-carboxyethenyl)-1,2-dihydroxybenzene.

6. An aqueous drilling fluid as claimed in claim 1 wherein the substituted dihydroxybenzene compound is present in the drilling fluid in an amount of from about 0.1 to 10 pounds per barrel of drilling fluid.

7. An aqueous drilling fluid as claimed in claim 1 wherein the substituted dihydroxybenzene compound is present in the drilling fluid in an amount of from about 0.25 to 5 pounds per barrel of drilling fluid.

8. A method of drilling wells wherein a drilling fluid is passed through the well in contact with earth formations during the drilling operation, the improvement which comprises contacting said earth formations with an aqueous drilling fluid containing clay solids dispersed therein and as the dispersant at least 0.1 pound per barrel of drilling fluid of a substituted dihydroxybenzene compound selected from the group consisting of a 1,2-dihydroxybenzene containing as a substituent in the 4 position, a nitro-, a chloro-, a formyl- or a (2'-carboxyethenyl)-group and mixtures of said compounds, said substituted dihydroxybenzene compound being present in the drilling fluid in an amount sufficient to reduce the viscosity thereof.

9. A method as claimed in claim 8 wherein the substituted dihydroxybenzene compound is 4-nitro-1,2-dihydroxybenzene.

10. A method as claimed in claim 8 wherein the substituted dihydroxybenzene compound is 4-chloro-1,2-dihydroxybenzene.

11. A method as claimed in claim 8 wherein the substituted dihydroxybenzene compound is 4-formyl-1,2-dihydroxybenzene.

12. A method as claimed in claim 8 wherein the substituted dihydroxybenzene compound is 4-(2'-carboxyethenyl)-1,2-dihydroxybenzene.

13. An aqueous drilling fluid as claimed in claim 8 wherein the substituted dihydroxybenzene compound is present in the drilling fluid in an amount of from about 0.1 to 10 pounds per barrel of drilling fluid.

14. An aqueous drilling fluid as claimed in claim 8 wherein the substituted dihydroxybenzene compound is present in the drilling fluid in an amount of from about 0.25 to 5 pounds per barrel of drilling fluid.

* * * * *

PO-1050
(5/69)

UNITED STATES PATENT OFFICE
CERTIFICATE OF CORRECTION

Patent No. 3,640,825      Dated February 8, 1972

Inventor(s) Jack H. Kolaian

It is certified that error appears in the above-identified patent and that said Letters Patent are hereby corrected as shown below:

Col. 10 - Table XI, Ex. 19, under "Time, Hours" add --24--
Col. 12 - Table XII, bottom line, change "dichlo-chloro" to --dichloro--
Col. 11 - Table XIII, Ex. 25, under "Amount and type dispersant", "WW" should be --XX--

Signed and sealed this 19th day of September 1972.

(SEAL)
Attest:

EDWARD M. FLETCHER, JR.
Attesting Officer

ROBERT GOTTSCHALK
Commissioner of Patents